US011135867B2

(12) United States Patent
Kitayama et al.

(10) Patent No.: US 11,135,867 B2
(45) Date of Patent: Oct. 5, 2021

(54) BOOK BLOCK CONVEYING DEVICE

(71) Applicant: Horizon International Inc., Takashima (JP)

(72) Inventors: Shinya Kitayama, Takashima (JP); Kohei Okamoto, Takashima (JP)

(73) Assignee: HORIZON INTERNATIONAL INC., Shiga (JP)

( * ) Notice: Subject to any disclaimer, the term of this patent is extended or adjusted under 35 U.S.C. 154(b) by 0 days.

(21) Appl. No.: 16/771,369

(22) PCT Filed: Feb. 8, 2019

(86) PCT No.: PCT/JP2019/004728
§ 371 (c)(1),
(2) Date: Jun. 10, 2020

(87) PCT Pub. No.: WO2019/167595
PCT Pub. Date: Sep. 6, 2019

(65) Prior Publication Data
US 2021/0178801 A1    Jun. 17, 2021

(30) Foreign Application Priority Data
Mar. 1, 2018 (WO) .................. PCT/JP2018/007844

(51) Int. Cl.
*B42C 19/08* (2006.01)
(52) U.S. Cl.
CPC .................. *B42C 19/08* (2013.01)
(58) Field of Classification Search
CPC ...................................................... B42C 19/08
See application file for complete search history.

(56) References Cited

U.S. PATENT DOCUMENTS

| 8,919,758 | B2* | 12/2014 | Mueller | B42C 19/08 |
|---|---|---|---|---|
| | | | | 270/52.02 |
| 10,259,250 | B2* | 4/2019 | Altenbach | B42C 19/08 |
| 2005/0236763 | A1* | 10/2005 | Grewe | B42C 19/08 |
| | | | | 271/277 |

FOREIGN PATENT DOCUMENTS

| DE | 3840816 A1 * | 6/1990 | ............. B42C 19/08 |
|---|---|---|---|
| DE | 19811635 A1 * | 9/1999 | ............. B42C 19/08 |

(Continued)

OTHER PUBLICATIONS

International Search Report dated Apr. 2, 2019, issued in counterpart International Application No. PCT/JP2019/004728 (1 page).

*Primary Examiner* — Kyle R Grabowski
(74) *Attorney, Agent, or Firm* — Westerman, Hattori, Daniels & Adrian, LLP (57) ABSTRACT

The device includes a first conveyor 1 and a second conveyor 12. The first conveyor transports the book blocks B to the bookbinding apparatus and can accumulate the book blocks on a transport surface 4. A first stopper 23 is arranged at an entrance of the second conveyor and a second stopper 28 is arranged in the middle of a path of book block on the transport surface of the first conveyor. The first and second stoppers can take a block position and a retracted position. The second conveyor and the first stopper operate in synchronization with an operation of the bookbinding apparatus. The second stopper takes the block position when the number of book blocks accumulated on upstream side of the first stopper exceeds a predetermined limit value, or when a thickness difference between the book blocks transported side by side exceeds a predetermined reference value.

7 Claims, 6 Drawing Sheets

(56) References Cited

FOREIGN PATENT DOCUMENTS

| | | | |
|---|---|---|---|
| DE | 102004023592 A1 * | 12/2005 | ............. B42C 19/08 |
| EP | 2803496 A1 * | 11/2014 | ............. B42C 19/08 |
| JP | 2017-205879 A | 11/2017 | |
| WO | 2016/207977 A1 | 12/2016 | |

* cited by examiner

BOOK BLOCK CONVEYING DEVICE

TECHNICAL FIELD

The present invention relates to a book block conveying device transporting book blocks one by one to a bookbinding apparatus so as to supply the book block to the bookbinding apparatus in synchronization with a motion of the bookbinding apparatus to take in the book block.

BACKGROUND ART

As a conventional bookbinding apparatus, for example, there is one disclosed in Patent Document 1.

The bookbinding apparatus disclosed in Patent Document 1 comprises one or more clampers movable along a predetermined path while gripping a book block in a standing state, a series of processing units arranged along the path to carry out perfect bookbinding. The clamper includes a pair of clamp plates movable between an open position at which the pair of clampers receives the book block therebetween and a closed position at which the pair of clamp plates grips the book block therebetween.

The bookbinding apparatus also comprises a book block supplying unit arranged at a book block supply position upstream of the series of processing units on the path to supply the book block to the clamper.

Thus when the clamper is arranged at the book block supply position, the book block is supplied from the book block supplying unit to the gap between the pair of clamp plates which takes the open position, and the pair of clamp plates the closed position, thereafter, the book block is bound while the clamper leaves the book block supply position and passes through the series of processing units.

A conventional book block forming apparatus comprises, for example, a printing machine or a copier, and a paper accumulating machine arranged downstream of the printing machine or the copier so as to sequentially collect paper sheets discharged from the printing machine or the copier and form a book block.

Or, a conventional book block forming apparatus comprises, for example, a first press unit arranged for press each of signatures along a fold line thereof, the signatures being supplied one by one into the first press unit from the fold line as a leading edge of the signature, a signature transport unit arranged downstream of the first press unit while controlling attitudes of the signatures in a manner such that the fold lines are perpendicular to the transport direction, a glue application unit arranged downstream of the signature transport unit to apply glue to both sides of the top face of each of the signatures received from the signature transport unit, an accumulation unit arranged downstream of the glue application unit to form a book block by stacking the signatures received from the glue application unit while jogging the stack of signatures, and a second press unit arranged downstream of the accumulation unit to receive and vertically press the book block fed from the accumulation unit and discharge the pressed book block.

In order to transport and deliver the book block formed by the book block forming apparatus to the bookbinding apparatus (book block supply unit), a book block conveying device is arranged between the book block forming apparatus and the bookbinding apparatus.

A conventional book block conveying device comprises, for example, an accumulating conveyor.

The accumulating conveyor has a plurality of rotating shafts extended at a right angle to a transport direction and spaced from each other, a drive roller fixed to one end of each of the rotating shafts, a plurality of idle rollers attached to each of the rotating shafts in a manner such that the idle rollers are rotatable around the associated rotating shaft, and an endless belt extended in the transport direction under the drive rollers and constantly driven to rotate in one direction in the vertical plane.

The upper surface of the endless belt is brought into contact with each of the drive rollers so that each of the rotating shaft is always driven to rotate in a direction of transporting the book block by the rotating endless belt.

In addition, upper surfaces of the idle rollers form a transport surface, and when the book block discharged from the book block forming apparatus is placed on the transport surface in a lying position, the idle rollers are brought into contact with the associated rotating shafts by the weight of the book block and driven to rotate together with the rotating shafts, and thereby the book block is transported.

An entrance of the accumulating conveyor is connected to a book block outlet of the book block forming apparatus, and a conveyor belt is arranged between an exit of the accumulating conveyor and a book block inlet of the bookbinding apparatus. Thus every time a clamper of the bookbinding apparatus reaches a book block supply position and takes an open position (the bookbinding apparatus is ready to take in the book block), the conveyor belt rotates to supply the book block from the accumulating conveyor to the bookbinding apparatus.

A transport speed of the conveyor belt is faster than a transport speed of the accumulating conveyor.

A stopper is arranged at the entrance of the conveyor belt so as to be movable between a block position at which the stopper enters a path of book block so as to stop the book block by making a front end of the book block collide with the stopper and a retracted position at which the stopper is retracted from the path of book block.

When the stopper takes the block position, the book block just before the stopper is stopped by the stopper, and while the book block is stopped, the idle rollers which are in contact with the book block remain still while slipping on the associated rotating shaft.

Thereafter, when the stopper takes the retracted position, the idle rollers on which the book block is placed rotate together with the associated rotating shaft and thereby the transport of the book block is started again.

On the other hand, when the stopper continues to take the block position, subsequent book blocks sequentially collide with previous book blocks so that the book blocks are accumulated in a row on the transport surface.

A sensor is arranged before the stopper to detect the book block. Then when the stopper takes the block position and the sensor detects the book block, the preparation for supplying the book block to the bookbinding apparatus is completed.

After that, when the clamper of the bookbinding apparatus reaches the book block supply position and takes the open position, the stopper takes the retracted position and the conveyor belt starts to rotate so that the book block is delivered from the accumulating conveyor to the conveyor belt and supplied from the conveyor belt to the bookbinding apparatus, and thereafter the conveyor belt stops.

Furthermore, the passage of the book block is detected by the sensor during delivery of the book block from the accumulating conveyor to the conveyor belt so that the stopper takes the block position again so as to stop the subsequent book block.

Thus, every time the bookbinding apparatus is ready to take in the book block, each book block is supplied from the book block conveying device to the bookbinding apparatus so as to be inserted into the clamper.

In the above configuration, when work such as cover change and glue refill and paper jam handling and so on is required, the bookbinding apparatus is temporarily stopped and correspondingly the supply of the book block from the book block conveying device to the bookbinding apparatus.

During this stop, the book blocks discharged from the book block forming apparatus are accumulated on the transport surface of the accumulating conveyor of the book block conveying device.

After that, when the bookbinding apparatus resumes operation, the book blocks accumulated in the book block conveying device are supplied one by one to the bookbinding apparatus.

Thereby it is possible to temporarily stop the bookbinding apparatus while continuously running the book block forming apparatus, and accordingly the decrease in production efficiency is inhibited.

However, according to this book block conveying device, if there is a great difference in the thickness between transported book blocks, the book block(s) sometimes collapse(s) when the accumulated book block(s) collide(s) with the subsequent book block, and thereby the book block cannot be supplied to the bookbinding apparatus.

Besides, even though the thickness of each of the book blocks is the same, as the number of accumulated book blocks increases, the line pressure exerted on a row of the book blocks increases and the book blocks of the row sometimes collapse, and thereby the book block cannot be supplied to the bookbinding apparatus.

In such cases, it is necessary to temporarily stop the book block forming apparatus and bookbinding apparatus and manually remove the broken book block(s), which leads to significant decline in production efficiency.

PRIOR ART DOCUMENTS

Patent Documents

Patent Document 1: JP 2017-205879 A
Patent Document 2: WO 2016/207977

SUMMARY OF THE INVENTION

Problems To Be Solved By The Invention

It is, therefore, an object of the present invention to provide a book block conveying device capable of supplying book blocks to a bookbinding device smoothly and stably at all times.

Means For Solving The Problems

In order to achieve the object, the present invention provides a book block conveying device transporting book blocks one by one in a lying position to a bookbinding apparatus so as to supply the book block to the bookbinding apparatus in synchronization with a motion of the bookbinding apparatus to take in the book block, comprising: a first conveyor having an entrance, an exit, and a transport surface extended from the entrance and the exit, the first conveyor transporting the book blocks placed on the transport surface on the one hand and being able to accumulate the book blocks on the transport surface on the other hand while being continuously operated at all times; a second conveyor arranged between the exit of the first conveyor and an intake of the bookbinding apparatus so as to supply the book blocks from the first conveyor to the bookbinding apparatus, a transport speed of the second conveyor being faster than a transport speed of the first conveyor; a first stopper arranged at the exit of the first conveyor, or between the first and second conveyors, or at an entrance of the second conveyor so as to move between a block position at which the first stopper enters a path of the book block so as to stop the book block by making a front end of the book block collide with the first stopper and a retracted position at which the first stopper is retracted from the path of book block; a sensor arranged upstream of the first stopper so as to detect the book block; a controller operatively connected to the second conveyor and the first stopper so as to synchronize motions of the second conveyor and the first stopper with the motion of the bookbinding apparatus to take in the book block based on both a detection signal of the sensor and a preparation completion signal of taking in the book block received from the bookbinding apparatus, characterized in that the book block conveying device further comprises: a second stopper arranged in the middle of the path of book block on the transport surface of the first conveyor so as to be movable between a block position at which the second stopper enters the path of book block and stops the book block by making the front end of the book block collide with the second stopper and a retracted position at which the second stopper is retracted from the path of book block, the controller being operatively connected to the second stopper; and a detection unit arranged upstream and/or downstream of the second stopper and connected to the controller so as to detect passage and thickness of the book block, wherein the controller includes a first monitoring section monitoring the number of the book blocks accumulated on upstream side of the first stopper based on book block passage detection signals of the detection unit or based on both the book block passage detection signals of the detection unit and detection signals of the sensor, and outputting a first restriction signal when the number of the book blocks exceeds a predetermined limit value, a second monitoring section calculating a thickness difference between the book blocks transported side by side based on thickness detection signals of the detection unit, and outputting a second restriction signal when the thickness difference exceeds a predetermined reference value, and a stopper control section sending a first control signal to the second stopper located at the retracted position so as to have the second stopper take the block position when the stopper control section receives the first or the second restriction signal.

According to a preferred embodiment of the present invention, the stopper control section of the controller sends a second control signal to the second stopper so as to have the second stopper take the retracted position when the stopper control section determines based on a count value of the first monitoring section that the number of the book blocks falls below a limit release value predetermined within a range of 0 to the limit value after the stopper control section receives the first restriction signal and sends the first control signal to the second stopper.

According to another preferred embodiment of the present invention, the stopper control section of the controller sends a second control signal to the second stopper so as to have the second stopper take the retracted position when the stopper control section determines based on a count value of the first monitoring section that the number of the book blocks accumulated becomes 0 after the stopper control section receives the second restriction signal and sends the first control signal to the second stopper.

According to further preferred embodiment of the present invention, the stopper control unit of the controller sends a second control signal to the second stopper so as to have the second stopper take the retracted position when a predetermined time has elapsed after sending the first control signal to the second stopper.

According to further preferred embodiment of the present invention, the second stopper includes a stop plate extending at a right angle to the transport surface of the first or the second conveyor and guided to be able to move in a direction crossing the transport surface up and down, and an air cylinder moving the stop plate, a piston rod of the air cylinder being able to move in a direction of movement of the stop plate, the stop plate being attached to the piston rod, wherein the stop plate protrudes on the transport surface when the second stopper is arranged at the block position, whereas the stop plate is retracted below the transport surface when the second stopper is arranged at the retracted position.

According to further preferred embodiment of the present invention, the detection unit is a ranging sensor arranged upstream of the second stopper and above the path of book block, and directed to the path of book block.

Alternatively, the detection unit comprises a ranging sensor arranged upstream of the second stopper and above the path of book block, and directed to the path of book block, and an optical sensor arranged downstream of the second stopper and outside the path of book block.

EFFECT OF THE INVENTION

According to the present invention, the book block conveying device comprises the first conveyor, and the second conveyor arranged between the first conveyor and the bookbinding apparatus. The first conveyor transports the book blocks placed on the transport surface on the one hand and can accumulate the book blocks on the transport surface on the other hand while being continuously operated at all times.

Moreover, the first stopper is arranged at the exit of the first conveyor, or between the first and second conveyors, or the entrance of the second conveyor, and the second stopper is arranged in the middle of the path of book block on the transport surface of the first conveyor. Each of the first and second stoppers is movable between the block position at which the stopper stops the book block and the retracted position at which the stopper allows passage of the book block.

Furthermore, the second conveyor and first, stopper is moved in synchronization with the motion of the bookbinding apparatus to take in the book blocks, and the second stopper takes the block position when the number of the book blocks which are accumulated on the upstream side of the first stopper exceeds the predetermined limit value, or when the thickness difference between the book blocks transported side by side exceeds the predetermined reference value.

Thus the limit value is preset as the number of book blocks that is not large enough to generate the line pressure collapsing the row of book blocks accumulated on the upstream side of the first stopper and the reference value is preset, as the thickness difference that is not large enough to collapse the accumulated book blocks at collision of the subsequent book block with the accumulated book block(s), and accordingly, a book block which may collapse the row of accumulated book blocks is stopped by the second stopper so as to be prevented from colliding with the row of accumulated book blocks and thereby the book block can be smoothly and stably supplied to the bookbinding apparatus at all times.

BRIEF DESCRIPTION OF THE DRAWINGS

FIG. 2(A) is a plan view of the book block conveying device shewn in FIG. 1, and (B) is a front view of the book block conveying device shown in FIG. 1.

FIG. 3(A) is a side view illustrating a main part of a first conveyor of the book block conveying device shown in FIG. 1, (B) is a side view illustrating attachment of idle rollers to a rotating shaft of the first conveyor, (C) is a front view illustrating a drive part of the first conveyor, and (D) is a perspective view of the drive part of the first conveyor viewed from under side.

FIG. 4 (A) is a front view illustrating a configuration near a second stopper of the book block conveying device shown in FIG. 1, and (B) is a side view viewed in an X-direction of (A).

FIG. 5 (A) is a front view illustrating a configuration near the second stopper of the book block conveying device shown in FIG. 1, and (B) is a side view viewed in an X-direction of (A).

BEST MODE FOR CARRYING OUT THE INVENTION

A preferred embodiment of the present invention will be explained below with reference to accompanying drawings.

Figure 1:
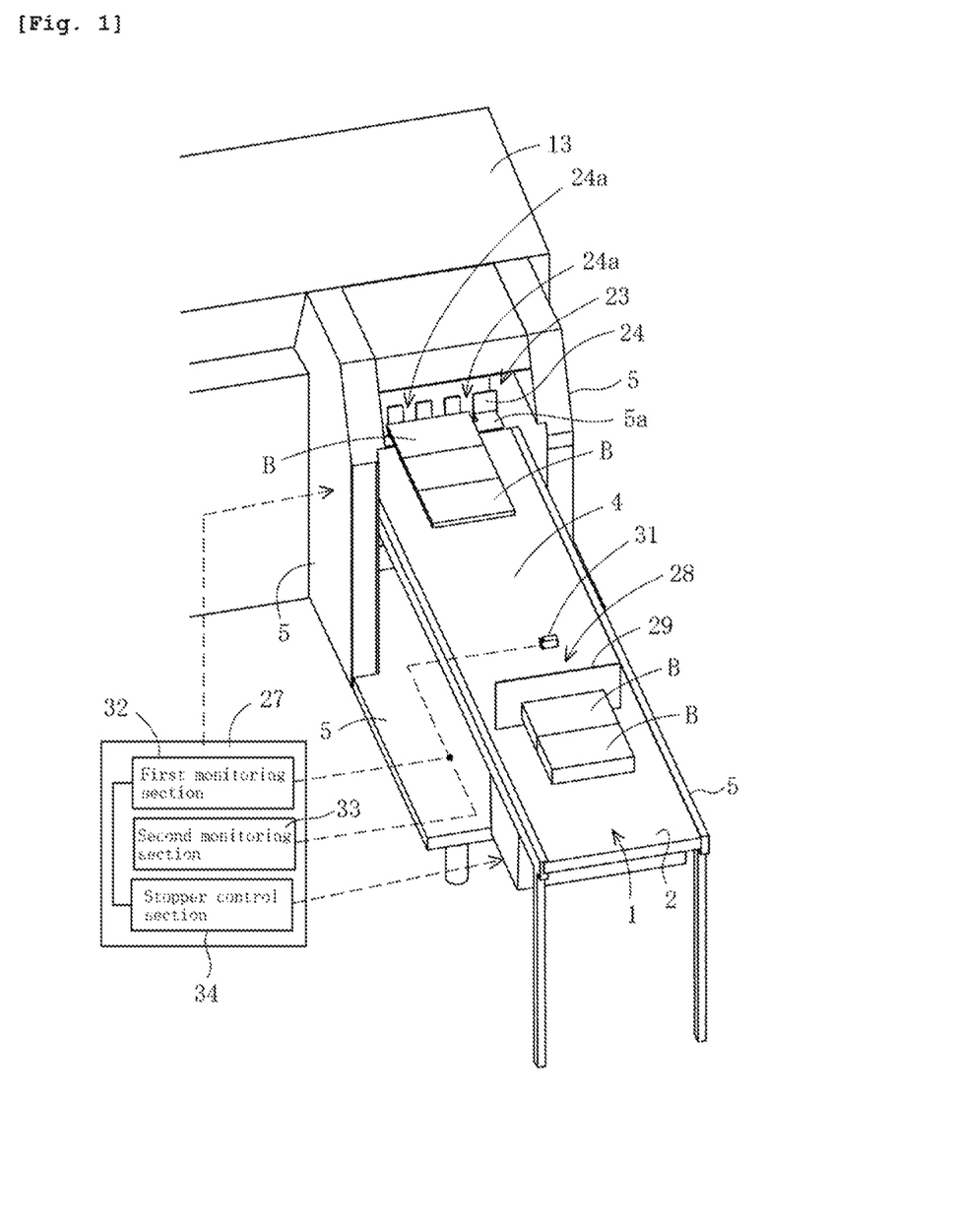
FIG. 1 a perspective view of a book block conveying device according to an embodiment of the present invention.

FIG. 1 is a perspective view of a book block, conveying device according to an embodiment of the present invention. FIG. 2(A) is a plan view of the book block conveying device shown in FIG. 1, and FIG. 2(B) is a front view of the book block conveying device shown in FIG. 1.

Figure 2:
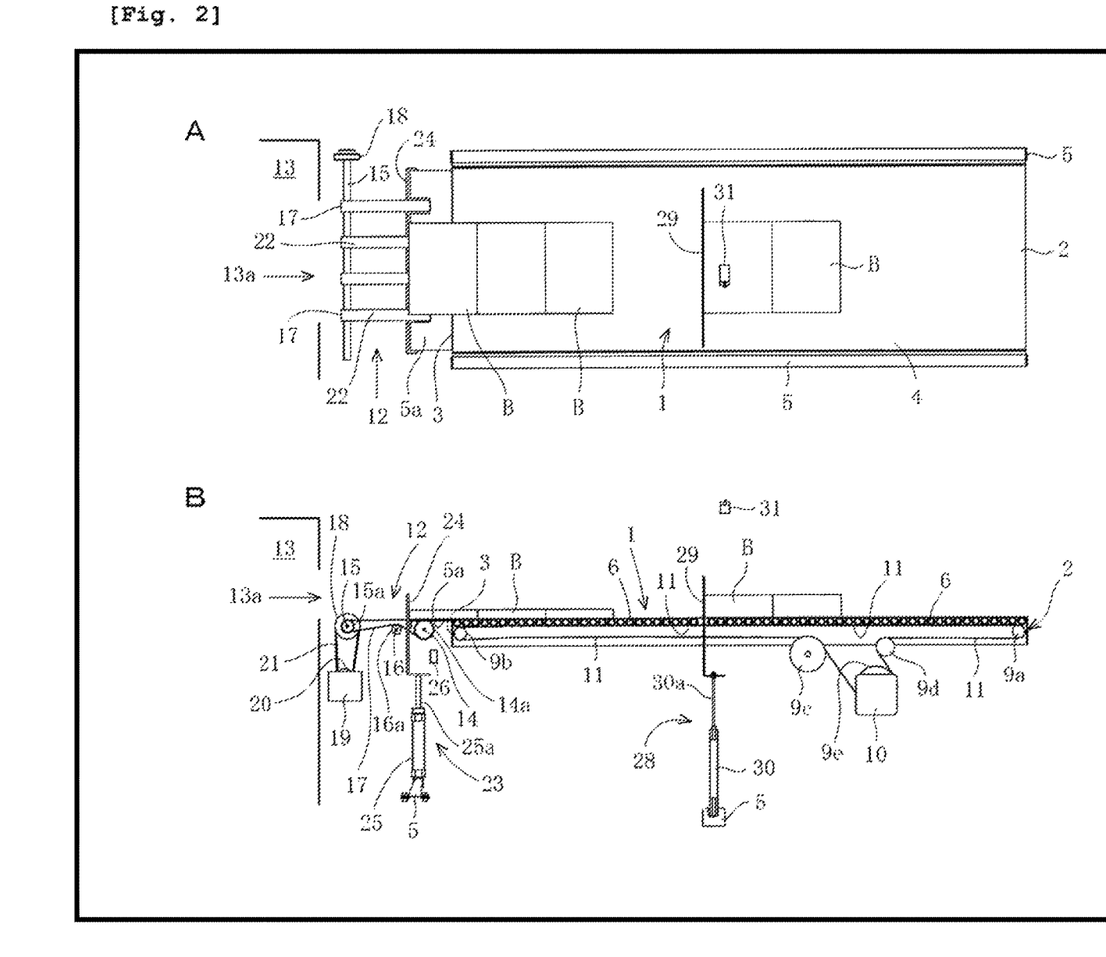

Referring to FIGS. 1 and 2, a book block conveying device comprises a first conveyor 1 having an entrance 2, an exit 3, and a transport surface 4 for a book block B extended from the entrance 2 and the exit 3.

FIG. 3(A) is a side view illustrating a main part of the first conveyor 1 of the book block conveying device shown in FIG. 1, and FIG. 3(B) is a side view illustrating attachment of idle rollers to a rotating shaft of the first conveyor 1. FIG. 3(C) is a front, view illustrating a drive part of the first conveyor 1, and FIG. 3(D) is a perspective view of the drive part of the first conveyor 1 viewed from under side.

Figure 3:
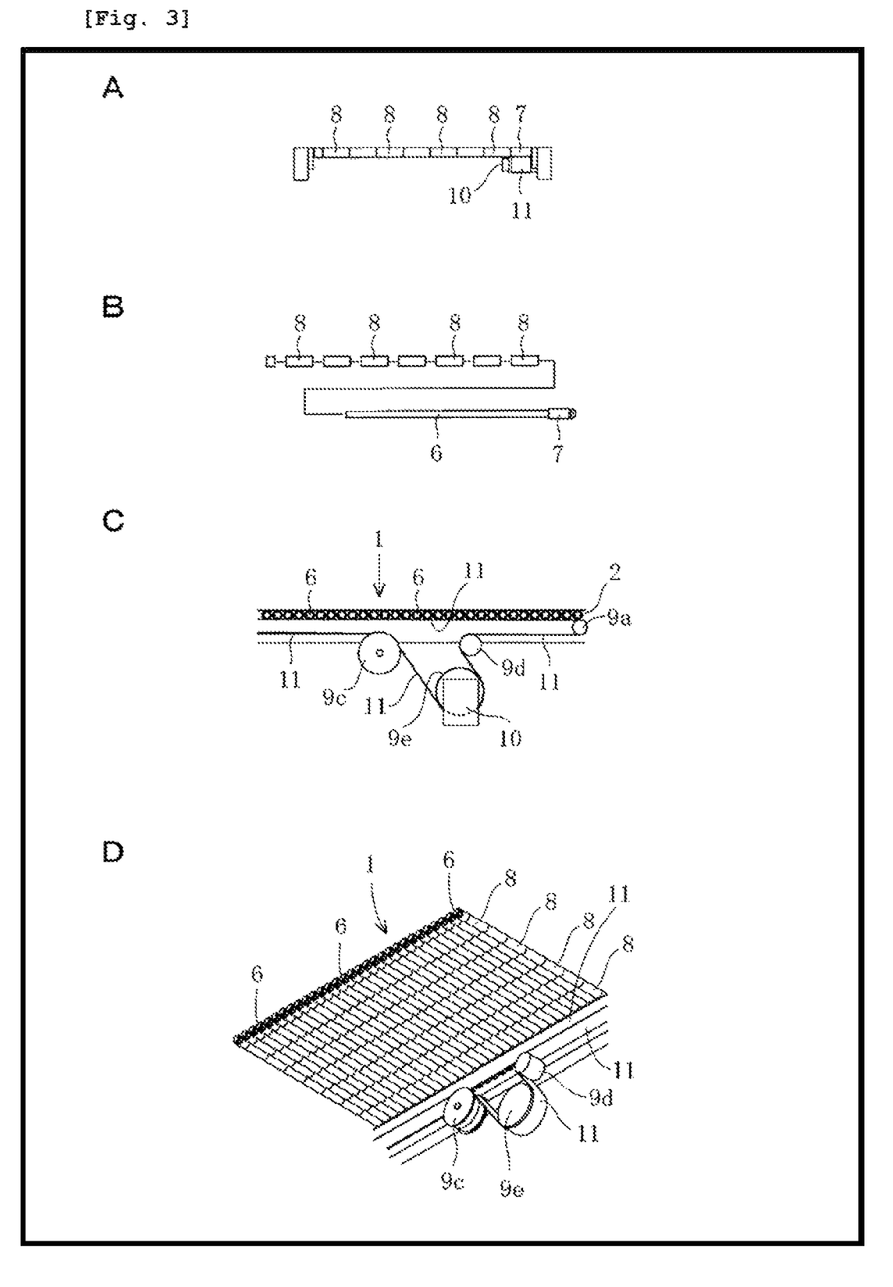

As shown in FIGS. 1 through 3, in this embodiment, the first, conveyor 1 has a frame 5, a plurality of rotating shafts 6 attached to the frame 5 so as to be extended at a right angle to a transport direction and spaced from each other in the transport direction, a drive roller 7 fixed to one end of each of the rotating shafts 6, a plurality of idle rollers 8 attached to each of the rotating shafts 6 in a manner such that the idle rollers 8 are rotatable around the associated rotating shaft 6.

The first conveyor 1 also has pulleys 9a, 9b are attached to the frame 5 so as to be rotatable around axes parallel to the rotating shafts 6 under the drive rollers 8 which are located at the entrance 2 and exit 3, and a pair of pulleys 9c, 9d are attached to the frame 5 so as to be rotatable around axes parallel to the rotating shafts 6 under the drive rollers 8 which are located in the middle of the transport surface 4.

The first conveyor further has a motor 10 attached to the frame 5 under the pair of pulleys 9c, 9d in such a way that a drive shaft (not shown) of the motor 10 extends parallel to the axes of the pulleys 9c, 9d. The drive shaft of the motor 10 is provided with a pulley 9e.

An endless belt 11 is extended between the pulleys 9a-9e and an upper surface of the endless belt 11 is brought into contact with a lower surface of each of the drive rollers 7.

Thus the endless belt 11 is rotated by the motor 10 and accordingly, each of the rotating shaft 6 is driven to rotate in a direction of transporting the book blocks B.

Upper surfaces of the idle rollers 8 form the transport surface 4, and when the book block B is placed on the transport surface 4, the idle rollers 8 are brought into contact with the associated rotating shafts 6 by the weight of the book block B and driven to rotate together with the rotating shafts 6, and thereby the book block B is transported.

The book block conveying device also comprises a second conveyor 12 arranged between the exit 3 of the first conveyor 1 and a book block inlet 13a of the bookbinding apparatus 13 so as to deliver the bock block B from the first conveyor 1 to the bookbinding apparatus 13.

In this embodiment, the second conveyor 12 has a first shaft 14 extending at a right angle to the transport direction on the first conveyor 1 side and attached to the frame 5 so as to be rotatable around an axis thereof, a second shaft 15 extending parallel to the first shaft 14 on the bookbinding apparatus 13 side and attached to the frame 5 so as to be rotatable around an axis thereof, and a third shaft 16 extending parallel to the first and second shafts 14, 15 between the first and second shafts 14, 15 and attached to the frame 5 so as to be rotatable around an axis thereof.

A plurality of roller elements 14a, 15a, 16a are fixed to each of the first through third shafts 14-16 and spaced apart from each other in an axial direction of the associated shaft 14, 15, 16, and further, an endless belt 17 is extended between the corresponding roller elements 14a, 15a, 16a of the first through third shafts 14-16.

A pulley 18 is mounted on one end of the second shaft 15.

The second conveyor 12 also has a motor 19 attached to the frame 5 under the pulley 18 of the second shaft 15 in a manner such that a drive shaft (not shown) of the motor 19 extends parallel to the second shaft 15. A pulley 20 is mounted on the drive shaft of the motor 19, and further an endless belt 21 is extended between the pulley 18 and the pulley 20.

Upper surfaces of the endless belts 17 form a transport surface 22 for the book blocks B.

Thus the endless belt 21 is rotated by the motor 19, and accordingly the endless belts 17 are driven to rotate so that the book block B is transported when the book block B is placed on the endless belts 17 (transport surface 22).

The endless belt 21 of the second conveyor 12 rotates to deliver the book block B from the first conveyor 1 to the bookbinding apparatus 13 every time the bookbinding apparatus 13 is ready to take in the book block B.

A transport speed of each of the first and second conveyors 1, 12 is preset in a manner such that the transport speed of the second conveyor 12 is faster than the transport speed of the first conveyor 1.

The book block conveying device of the present invention further comprises a first stopper 23 arranged at an entrance of the second conveyor 12 so as to move between a block position at which the first stopper 23 enters a path of the book block B so as to stop the book block B by making a front end of the book block B collide with the first stopper 23 and a retracted position at which the first stopper 23 is retracted from the path of book block B.

The first stopper 23 has a stop plate 24 extended perpendicular to the transport surface 22 of the second conveyor 12 and in a width direction of the transport surface 22 and movable in a direction crossing the transport surface 22 up and down.

The stop plate 24 is provided with slits 24a at positions thereof corresponding to each of the endless belts 17 of the second conveyor 12. The slits 24a extend downwardly from an upper end of the stop plate 24 and parallel to each other. Thereby the stop plate 24 can cross the transport surface 22 up and down without interfering with the rotation of the endless belts 17.

The first stopper also has one or more slide guides (not shown) attached to the frame 5 so as to guide the stop plate 24 and an air cylinder 25 moving the stop plate 24.

A piston rod 25a of the air cylinder 25 can move in a direction of movement of the stop plate 24 and the stop plate 24 is attached to the piston rod 25a.

Then when the first stopper 23 takes the block position, the stop plate 24 protrudes on the transport surface 22, whereas the stop plate 24 is retracted downward from the transport surface 24 when the first stopper 23 takes the retracted position.

Thus when the first stopper 23 takes the block position and the step plate 24 protrudes on the transport surface 24, the book block B just before the stop plate 24 is stopped by colliding with the stop plate 24, and while the book block B is stopped, the idle rollers 8 of the first conveyor 1 which are in contact with the book block B remain still while slipping on the associated rotating shaft 6.

In this embodiment, when the book block B is stepped by the stop plate 24, a front end of the book block B is located on the transport surface 22 of the second conveyor 12, whereas a back end of the book block B is located on the transport surface 4 of the first conveyor 1.

A support plate 5a is arranged between the exit 3 of the first conveyor 1 and the stop plate 24 so as to support an underside of the book block B, and thereby, the delivery of the book block B from the first conveyor 1 to the second conveyor 12 is done smoothly.

Thereafter, when the first stopper 23 takes the retracted position, the idle rollers S of the first conveyor 1 on which the book block B is placed rotate together with the associated rotating shaft 6 and thereby the transport of the book block B is started again.

When the stopper continues to take the block position, subsequent book blocks B sequentially collide with previous book blocks B so that the book blocks B are accumulated in a row on the transport surface 22 on upstream side of the first stopper 23 (stop plate 24).

The book block conveying device of the present invention further comprises a sensor 26 arranged on upstream side of the first stopper 23 to detect the book block B, and a controller 27 operatively connected to the second conveyor 12 (motor 19) and the first stopper 23 (air cylinder 25).

The controller 27 synchronizes motions of the second conveyor 12 and the first stopper 23 with the motion of the bookbinding apparatus 13 to take in the book block B based on both a detection signal of the sensor 26 and a preparation completion signal of taking in the book block B received from the bookbinding apparatus 13.

This is done as follows.

When the first stopper 23 takes the block position and the sensor 26 detects the book block B, the controller 27 determines that the preparation for supplying the book block B is completed.

When the controller 27 has already received the preparation completion signal of taking in the book block at this point, or later when the controller 27 receives the preparation completion signal of taking in the book block, the controller 27 causes the first stopper 23 to take the retracted position and starts the second conveyor 12.

At this time, even though a plurality of book blocks B are accumulated on upstream side of the first stopper 23, the first book block B is easily separated from the following book blocks B, delivered from the first conveyor 1 to the second conveyor 12, and delivered from the second conveyor 12 to the bookbinding apparatus 13, because the transport speed of the second conveyor 12 is faster than the transport speed of the first conveyor 1.

The controller 27 stops the second conveyor 12 when the supply of the book block B to the bookbinding apparatus 13 is completed.

Furthermore, the sensor 26 detects passage of the book block B during the delivery of the book block B from the first conveyor 1 to the second conveyor 12, when this detection signal is received by the controller 27, the controller 27 causes the first stopper 23 to take the block position so as to stop the subsequent book blocks B.

Thus every time the bookbinding apparatus 13 is ready to take in the book block, each book block is delivered from the book block conveying device to the book binding apparatus.

The book block conveying device of the present invention further comprises a second stopper 28 arranged in the middle of the path of book block B on the transport surface 4 of the first conveyor 1 so as to be movable between a block position at which the second stopper 28 enters the path of book block B and stops the book block B by making the front end of the book block B collide with the second stopper 28 and a retracted position at which the second stopper 28 is retracted from the path of book block B.

FIG. 4(A) is a front view illustrating a configuration near the second stopper of the book block conveying device shewn in FIG. 1, and FIG. 4(B) is a side view viewed in an X-direction of FIG. 4(A). FIG. 5(A) is a front view illustrating a configuration near the second stopper of the book block conveying device shown in FIG. 1, and FIG. 5(B) is a side view viewed in an X-direction of FIG. 5 (A).

Figure 4:
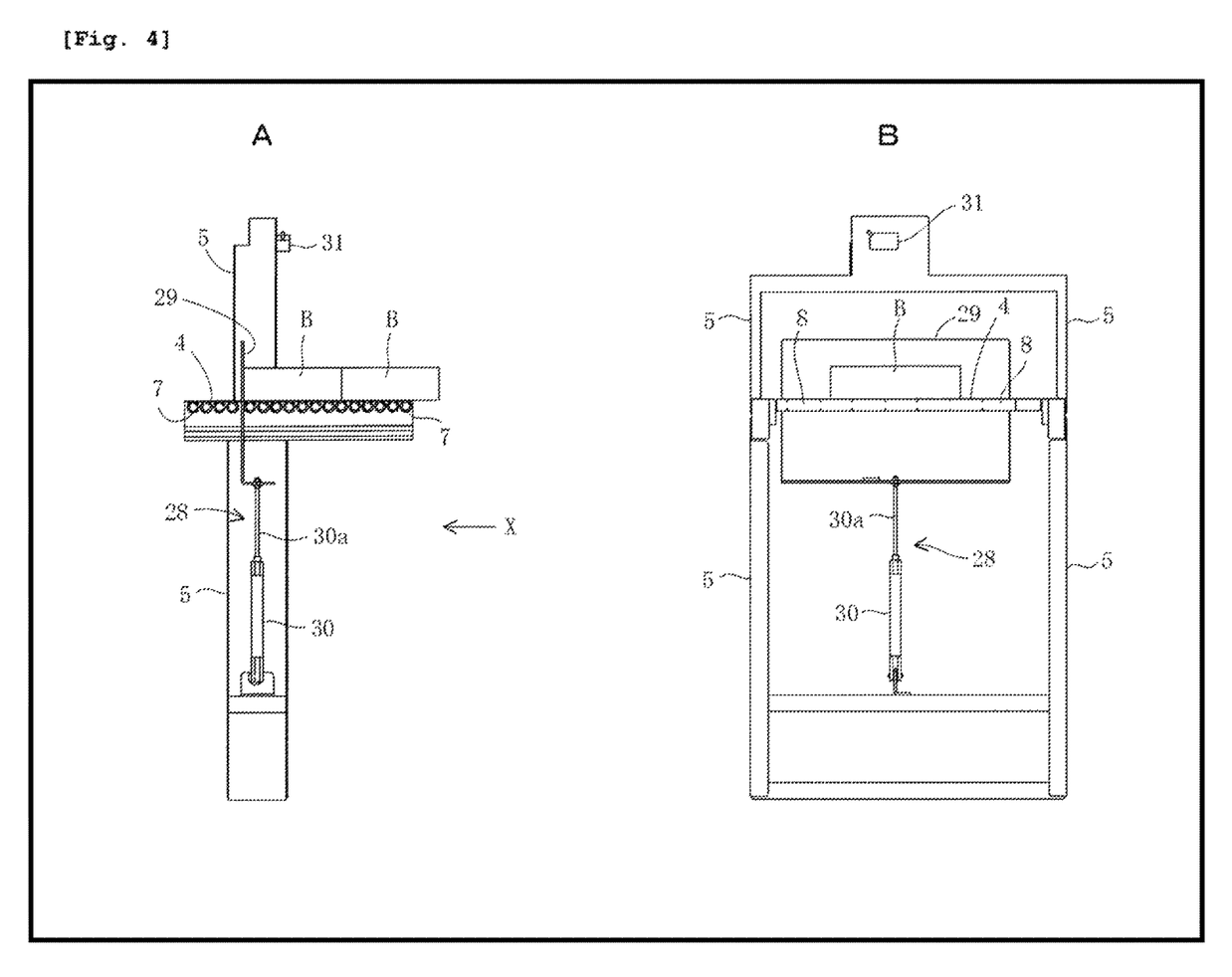
Figure 5:
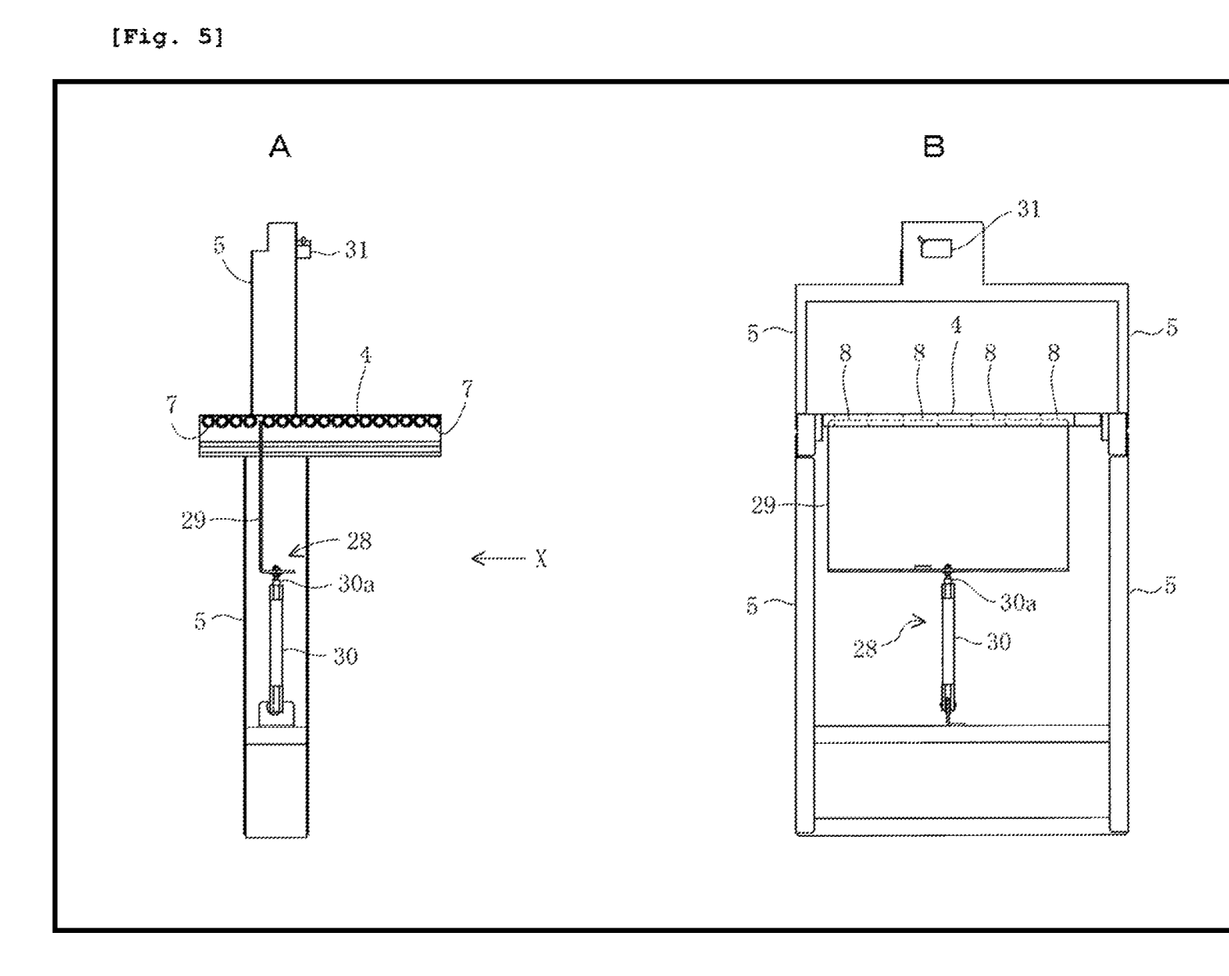

As shown in FIGS. 4 and 5, the second stopper 28 has a stop plate 29 extended perpendicular to the transport surface 4 of the first conveyor 1 and in a width direction of the transport surface 4 and movable in a direction crossing the transport surface 4 up and down.

The second stopper 28 also has one or more slide guides (not shown) attached to the frame 5 so as to guide the stop plate 29 and an air cylinder 30 moving the stop plate 29.

A piston rod 30a of the air cylinder 30 can move in a direction of movement of the stop plate 29 and the stop plate 29 is attached to the piston rod 30a.

Then when the second stopper 28 takes the block position, the stop plate 25 protrudes on the transport surface 4, whereas the stop plate 29 is retracted downward from the transport surface 4 when the second stopper 28 takes the retracted position.

The controller 27 is operatively connected to the second stopper 28 (air cylinder 25).

A ranging sensor 31 is arranged on upstream side of the second stopper 28 and connected to the controller 27 so as to detect passage and thickness of the book block B.

The ranging sensor 31 is arranged downward above the path of book block B.

Although the ranging sensor 31 normally detects a distance (first distance) from the ranging sensor 31 to the transport surface 4 of the first conveyor 1, when the book block B passes under the ranging sensor 31, the ranging sensor 31 detects a distance (second distance) from the ranging sensor 31 to an upper surface of the book block B.

Then the thickness of the book block B is determined by a difference between the first and second distances.

In this way, the ranging sensor 31 detects the passage and thickness of the book block B.

The controller 27 includes a first monitoring section 32 monitoring the number of the book blocks B accumulated on upstream side of the first stopper 23 based on book block passage detection signals of the ranging sensor 31 and detection signals of the sensor 26, and outputting a first restriction signal when the number of the book blocks B exceeds a predetermined limit value.

In this case, the monitoring of the number of the accumulated book blocks B is carried out by counting the number of the accumulated book blocks B, that is, by increasing the number of the accumulated book blocks B by one each time the book block passage detection signal is outputted from the ranging sensor 31 on the one hand, by-decreasing the number of the accumulated book blocks B by one each time the detection signal is outputted from the sensor 26 on the other hand.

The limit value is preset as the number of book blocks B that is not large enough to generate the line pressure collapsing a row of book blocks accumulated on the upstream side of the first stopper 23.

The controller 27 includes a second monitoring section 33 calculating a thickness difference between the book blocks B transported side by side based on thickness detection signals of the ranging sensor 31, and outputting a second restriction signal when the thickness difference exceeds a predetermined reference value.

The reference value is preset as the thickness difference that is not large enough to collapse the accumulated book blocks B at collision of the subsequent book block B with the accumulated book block(s) B.

The controller 27 further includes a stopper control section 34 sending a first control signal to the second stopper 28 located at the retracted position so as to have the second stopper 28 take the block position when the stopper control section 27 receives the first or the second restriction signal.

The stopper control section 34 sends a second control signal to the second stopper 28 so as to have the second stopper 28 take the retracted position when the stopper control section 34 determines based on a count value of the first monitoring section 32 that the number of the accumulated book blocks B falls below a limit release value predetermined within a range of 0 to the limit value after the stopper control section 34 receives the first restriction signal and sends the first control signal to the second stopper 28, whereas the stopper control section 34 sends the second control signal to the second stopper 28 when the stopper control section 34 determines based on the count value of the first monitoring section 32 that the number of the accumulated book blocks B becomes 0 after the stepper control section 34 receives the second restriction signal and sends the first control signal to the second stepper 28.

Thus when a book block B which may collapse a row of book blocks B formed on upstream side of the first stopper 23 is transported, the second stopper 28 located at the retracted position takes the block position so that the book block B is stopped by the second stopper 28 (stop plate 29) by colliding with the second stopper 28 (stop plate 29). While the book block B is stopped, the idle rollers 8 of the first conveyor 1 which are in contact with the book block B remain still while slipping on the associated rotating shaft 6.

Thereby a book block B which may collapse a row of accumulated book blocks B is prevented from colliding with the row of accumulated book blocks B, that is, the collapse of the row of accumulated book blocks B is avoided.

Moreover, during this stopping of the book block B, the book blocks B accumulated on upstream side of the first stopper 23 are supplied one by one to the bookbinding apparatus 13.

Thereafter when it is determined by the stopper control section 34 of the controller 27 that there is no longer a risk that the accumulated book block(s) B will collapse, the second stopper 28 is started to take the retracted position.

When the second stopper 28 takes the retracted position, the idle rollers 8 of the first conveyor 1 on which the book block B is placed rotate together with the associated rotating shaft 6 and thereby the transport of the book block B is started again.

In this way, according to the book block conveying device of the present invention, the book block B can be smoothly and stably supplied to the bookbinding apparatus 13 at all times.

Then, for example, when a book block outlet of a book block forming apparatus is connected to the entrance 2 of the first conveyor 1 of the book block conveying device of the present invention, it is possible to suspend the bookbinding apparatus while keeping the book block forming apparatus running continuously, and accumulate book blocks in the book block conveying device without collapsing the book blocks during the suspend, and smoothly supply the accumulated book blocks one by one to the bookbinding apparatus at resuming the operation of the bookbinding apparatus, and thereby prevent, decline in production efficiency.

Although, in this embodiment, the controller 27 (stopper control section 34) monitors the change (decrease) in the number of the book blocks B accumulated by the first stopper 1 after stopping of the book block B by the second stopper 28 and causes the second stopper 28 to take the retracted position when the controller 27 (stopper control section 34) determines that there is no longer a risk that the accumulated book block(s) B will collapse, it is possible to prevent the controller 27 (stopper control section 34) from having such configuration.

In such case, after the book block B is stopped by the second stopper 28, an operator monitors the change in the number of the book blocks B accumulated by the first stepper 1 and activates the second stopper 28 to take the retracted position when the operator determines that there is no longer a risk that the accumulated book block(s) B will collapse.

Although the preferred embodiment of the present invention has been set forth for purposes of illustration, the foregoing description should not be deemed a limitation of the invention herein. Accordingly, various modifications, adaptations and alternatives may occur to one skilled in the art without departing from the spirit and the scope of the present invention.

For example, the first conveyor 1 may have any configuration as long as the first conveyor 1 can transport the book blocks B placed on a transport surface thereof on the one hand and accumulate the book blocks B on the transport surface on the other hand while being continuously operated at all times. Also, although the second conveyor 12 is a conveyor belt in the above embodiment, another kind of conveyor such as a roller conveyor can be used as the second conveyor 12.

A configuration of each of the first and second stoppers 23, 28 is not limited to the above embodiment. Each of the first and second stoppers 23, 28 may have any configuration as long as the stopper 23, 28 is movable between the block position at which the stopper 23, 28 enters the path of book block B to stop the book block B by making a front end of the book block B collide with the stopper 23, 28 and the retracted position at which the stopper 23, 28 is retracted from the path of book block B.

Although the number of the book blocks B accumulated on an accumulation area (an area extending between the first and second stoppers 23, 28) is counted by detecting the passage of the book blocks B using the ranging sensor 31 and sensor 26 which are arranged at an entrance of the accumulation area (second stopper 28) and an exit of the accumulation area (first stopper 23), respectively in the above embodiment, instead of that, it is possible to replace the number of book blocks B with a length of the book blocks B entering/exiting the accumulation area, measure the length of the book blocks B, and have the second stopper 28 take the block position when the length of the book blocks B exceeds a predetermined length.

Furthermore, although the ranging sensor 31 is used to detect the thickness of the book block B in the above embodiment, instead of the ranging sensor 31, a reader for reading a bar code or a 2D code etc. may be used.

In this case, a top sheet (or signature) of the book block B is provided with the barcode or the 2D code etc. indicating the number of sheets (or signatures) which make up the book block B at an upper surface thereof, and the second monitoring section 33 calculates the thickness of the book block B using the number of sheets (or signatures) read by the reader and pre-entered thickness per sheet (or signature).

According to another embodiment, the stopper control section 34 of the controller 27 sends the second control signal to the second stopper 28 so as to have the second stopper 28 take the retracted position when a predetermined time has elapsed after the stopper control section 34 receives the first or the second restriction signal and has the second stopper 28 take the block position.

In this case, the predetermined time is preset as a time that is sufficiently longer than the time required for the number of the book blocks B accumulated on upstream side of the first stopper 23 to reach zero after the second stepper 28 takes the block position.

Figure 6:
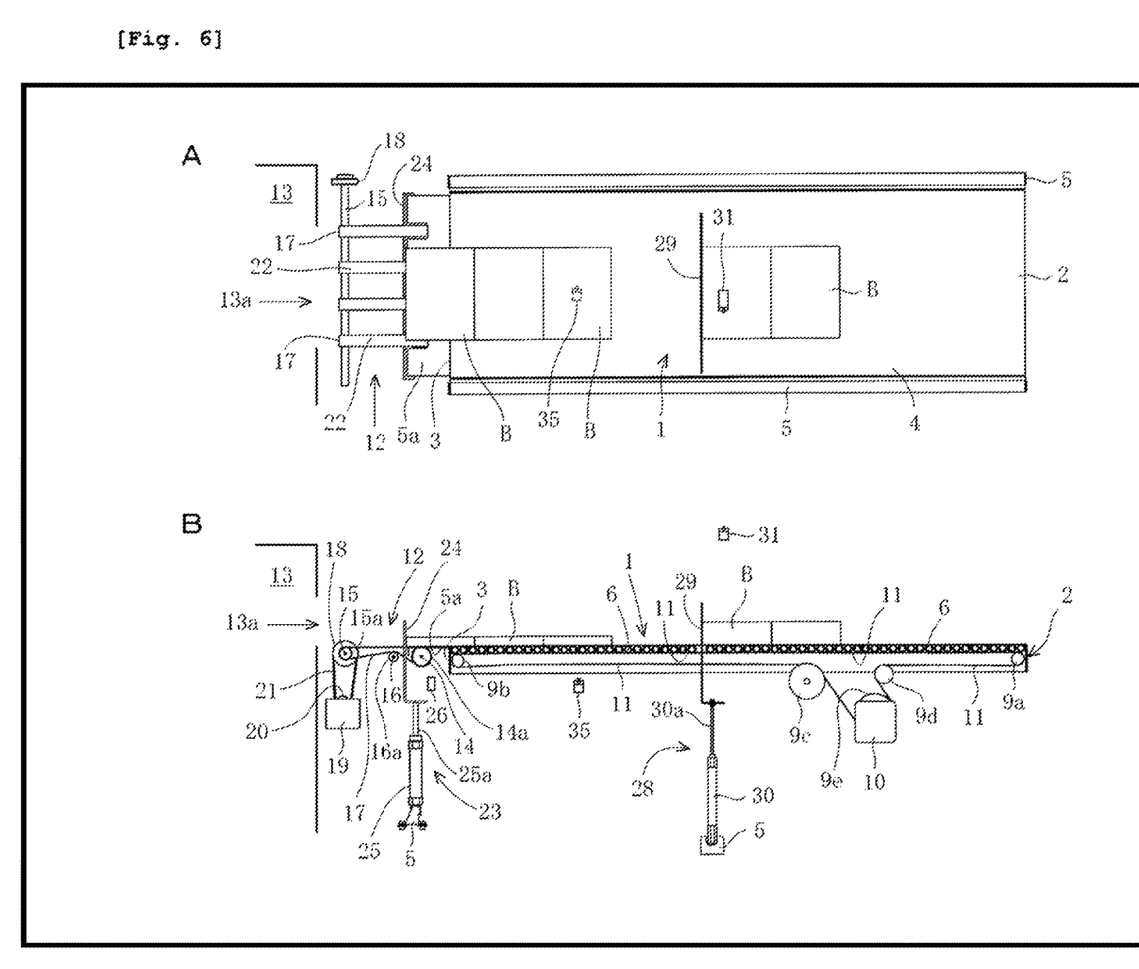
FIG. 6 a view similar to FIG. 2 illustrating a configuration of a book block conveying device according to another embodiment of the present invention.

FIG. 6 is a view similar to FIG. 2 illustrating a configuration of a book block conveying device according to another embodiment of the present invention.

The embodiment shown in FIG. 6 differs from the embodiment shown in FIGS. 1 through 5 only in a configuration of the detection unit and a monitoring method of the number of the book blocks B accumulated in the accumulation area. Therefore, in FIG. 6, the same structural elements as shown in FIGS. 1 through 5 are identified with the same reference numerals as used in FIGS. 1 through 5, and the detailed explanation thereof will be omitted in what follows.

Referring to FIG. 6, in this embodiment, the detection unit comprises a ranging sensor 31 arranged upstream of the second stopper 28 (similar to the embodiment of FIGS. 1 through 5), and an optical sensor 35 arranged downstream of the second stopper 28 and outside ("underside" in this embodiment) the path of book block B.

In this case, the ranging sensor 31 functions only as a sensor detecting the thickness of the book block B entering the accumulation area, while the optical sensor 35 functions as a sensor detecting the passage of the book block B.

Thus the book block B blocks a detection area of the optical sensor 35 and thereby the optical sensor 35 switches from OFF to ON so that the passage of the book block B is detected. In this case, when the optical sensor 35 is on for a predetermined time, the first monitoring section 32 determines that the number of the book blocks B accumulated in the accumulation area reaches the limit value and outputs the first restriction signal. Thereby the stopper control section 34 has the second stopper 28 take the block position so as to prevent new book blocks from entering the accumulation area.

Thereafter, when a predetermined time has passed, the stopper control section 34 sends the second control signal to the second stopper 28 so as to have the second stopper 28 take the retracted position. The predetermined time is preset as a time that is sufficiently longer than the time required for the number of the book blocks B in the accumulation area to reach zero after the second stepper 28 takes the block position.

Alternatively, the stopper control section 34 sends the second control signal to the second stopper 28 so as to cause the second stopper 28 to take the retracted position when the optical sensor 35 is turned off again.

DESCRIPTION OF REFERENCE NUMERALS

1 First conveyor
2 Entrance
3 Exit
4 Transport surface
5 Frame
5a Support plate
6 Rotating shaft
7 Drive roller
8 Idle roller
9a-9e Pulley
10 Motor
11 Endless belt
12 Second conveyor
13 Bookbinding apparatus
13a Book block inlet
14 First shaft
14a Roller element
Second shaft
15a Roller element
16 Third shaft
16a Roller element
17 Endless belt
18 Pulley
19 Motor
20 Pulley
21 Endless belt
22 Transport surface
23 First stopper
24 Stop plate
24a Slit
25 Air cylinder
25a Piston rod
26 Sensor
27 Controller
28 Second stopper
29 Stop plate
30 Air cylinder
30a Piston rod
31 Ranging sensor
32 First monitoring section
33 Second monitoring section
34 Stopper control section
35 Optical sensor
B Book block

The invention claimed is:

1. A book block conveying device transporting book blocks one by one in a lying position to a bookbinding apparatus so as to supply the book block to the bookbinding apparatus in synchronization with a motion of the bookbinding apparatus to take in the book block, comprising:
a first conveyor having an entrance, an exit, and a transport surface extended from the entrance and the exit, the first conveyor transporting the book blocks placed on the transport surface on the one hand and being able to accumulate the book blocks on the transport surface on the other hand while being continuously operated at all times;
a second conveyor arranged between the exit of the first conveyor and an intake of the bookbinding apparatus so as to supply the book blocks from the first conveyor to the bookbinding apparatus,
a transport speed of the second conveyor being faster than a transport speed of the first conveyor;
a first stopper arranged at the exit of the first conveyor, or between the first and second conveyors, or at an entrance of the second conveyor so as to move between a block position at which the first stopper enters a path of the book block so as to stop the book block by making a front end of the book block collide with the first stopper and a retracted position at which the first stopper is retracted from the path of book block;
a sensor arranged upstream of the first stopper so as to detect the bock block;
a controller operatively connected to the second conveyor and the first stopper so as to synchronize motion of the second conveyor and the first stopper with the motion of the bookbinding apparatus to take in the book block based on both a detection signal of the sensor and a preparation completion signal of taking in the book block-received from the bookbinding apparatus, characterized in that
the book block conveying device further comprises:
a second stopper arranged in the middle of the path of book block on the transport surface of the first conveyor so as to be movable between a block position at which the second stepper enters the path of book block and stops the book block by making the front end of the book block collide with the second stopper and a retracted position at which the second stopper is retracted from the path of book block,
the controller being operatively connected to the second stopper; and
a detection unit arranged upstream and/or downstream of the second stopper and connected to the controller so as to detect passage and thickness of the book block, wherein
the controller includes
a first monitoring section monitoring the number of the book blocks accumulated on upstream side of the first stopper based on book block passage detection signals of the detection unit or based on both the book block passage detection signals of the detection unit and detection signals of the sensor, and outputting a first restriction signal when the number of the book blocks exceeds a predetermined limit value,
a second monitoring section calculating a thickness difference between the book blocks transported side by side based on thickness detection signals of the detection unit, and outputting a second restriction signal when the thickness difference exceeds a predetermined reference value, and a stopper control section sending a first control signal to the second stopper located at the retracted position so as to have the second stopper take the block position when the stopper control section receives the first or the second restriction signal.

2. The book block conveying device according to claim 1, wherein the stopper control section of the controller sends a second control signal to the second stopper so as to have the second stopper take the retracted position when the stopper control section determines based on a count value of the first monitoring section that the number of the accumulated book blocks falls below a limit release value predetermined within a range of 0 to the limit value after the stopper control section receives the first restriction signal and sends the first control signal to the second stopper.

3. The book block conveying device according to claim 1, wherein the stopper control section of the controller sends a second control signal to the second stopper so as to have the second stopper take the retracted position when the stopper control section determines based on a count value of the first monitoring section that the number of the accumulated book blocks becomes 0 after the stopper control section receives the second restriction signal and sends the first control signal to the second stopper.

4. The book block conveying device according to claim 1, wherein the stopper control unit of the controller sends a second control signal to the second stopper so as to have the second stopper take the retracted position when a predetermined time has elapsed after sending the first control signal to the second stopper.

5. The book block conveying device according to claim 1, wherein the second stopper includes a stop plate extending at a right angle to the transport surface of the first or the second conveyor and guided to be able to move in a direction crossing the transport surface up and down, and an air cylinder moving the stop plate, a piston rod of the air cylinder being able to move in a direction of movement of the stop plate, the stop plate being attached to the piston rod, wherein the step plate protrudes on the transport surface when the second stopper is arranged at the block position, whereas the stop plate is retracted below the transport surface when the second stopper is arranged at the retracted position.

6. The book block conveying device according to claim 1, wherein the detection unit is a ranging sensor arranged upstream of the second stopper and above the path of book block, and directed to the path of book block.

7. The book block conveying device according to claim 1, wherein the detection unit comprises a ranging sensor arranged upstream of the second stopper and above the path of book block, and directed to the path of book block, and an optical sensor arranged downstream of the second stopper and outside the path of book block.

* * * * *